(12) United States Patent
Bunczek et al.

(10) Patent No.: US 6,190,706 B1
(45) Date of Patent: *Feb. 20, 2001

(54) CHEWING GUM AND GUM BASES HAVING REDUCED ADHESION TO ENVIRONMENTAL SURFACES AND METHOD FOR MAKING

(75) Inventors: Michael T. Bunczek, Lisle; Philip Urnezis, Lombard, both of IL (US)

(73) Assignee: Wm. Wrigley Jr. Company, Chicago, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/998,138

(22) Filed: Dec. 23, 1997

(51) Int. Cl.[7] .................................... A23G 3/30
(52) U.S. Cl. .................................. 426/6; 426/3
(58) Field of Search ........................ 426/3, 6, 5

(56) References Cited

U.S. PATENT DOCUMENTS

| | | |
|---|---|---|
| 2,525,072 | 10/1950 | Kearby . |
| 2,761,782 | 9/1956 | Leonard . |
| 4,525,363 | 6/1985 | D'Amelia et al. ................. 426/3 |
| 4,891,209 | 1/1990 | Heim ............................. 426/3 |
| 5,126,151 * | 6/1992 | Bodor et al. ................. 426/5 X |
| 5,380,530 | 1/1995 | Hill ........................... 424/440 |
| 5,433,960 | 7/1995 | Meyers ......................... 426/5 |
| 5,580,590 | 12/1996 | Hartman ....................... 426/3 |
| 5,645,853 | 7/1997 | Winston et al. ................ 426/3 |
| 5,945,143 * | 8/1999 | Bunczek ....................... 426/3 |

FOREIGN PATENT DOCUMENTS

| | | |
|---|---|---|
| 88-7747 | 1/1988 | (JP) . |
| 96-131082 | 5/1996 | (JP) . |

* cited by examiner

*Primary Examiner*—Arthur L. Corbin
(74) *Attorney, Agent, or Firm*—Bell, Boyd & Lloyd LLC

(57) ABSTRACT

A gum base including a siloxane polymer, a polar polymer and optionally a filler, chewing gums made from the gum base as well as methods for manufacturing chewing gum and gum bases are disclosed.

29 Claims, No Drawings

CHEWING GUM AND GUM BASES HAVING REDUCED ADHESION TO ENVIRONMENTAL SURFACES AND METHOD FOR MAKING

BACKGROUND OF THE INVENTION

The present invention relates generally to chewing gum compositions and methods of making same. More specifically, the present invention relates to gum bases that create a chewing gum that has a reduced adhesion to environmental surfaces.

For hundreds of years, gum like substances have been chewed. In the late 1800's the predecessor to today's chewing gum compositions were developed. Chewing gum is enjoyed daily by millions of people worldwide.

Chewed gum cuds can be disposed of in a number of substrates by wrapping the substrate around the chewed gum. In fact, chewed gum is easily disposed of in the wrapper that initially houses the chewing gum.

But, chewed gum cuds when carelessly discarded, can adhere to environmental surfaces. Such surfaces include concrete, brick, wood, carpets, and fabrics. This is due to the fact that chewing gum, due to its formulation, typically has an adhesive-like characteristic after it is chewed. Therefore, a chewed gum cud can stick to surfaces on which it is placed or onto which it is discarded. Chewed gum cuds that adhere to environmental surfaces can be an unsightly nuisance. Such gum cuds can be difficult, time consuming, and expensive to remove.

There is therefore a need for chewing gum that will not adhere, or will have a reduced adherence, to environmental surfaces such as concrete, brick, wood, carpet and fabrics.

SUMMARY OF THE INVENTION

The present invention provides improved gum base and chewing gums made from the gum bases. These gum bases are less adhesive, creating chewed gum cuds that are easier to remove than conventional chewed gum cuds, but retain desirable chewing characteristics.

To this end, in an embodiment, the present invention provides a gum base comprising a siloxane polymer and a polar polymer.

In an embodiment, the gum base further comprises a filler.

In an embodiment, the siloxane polymer is polydimethylsiloxane.

In an embodiment, the siloxane polymer has an average molecular weight of approximately 200,000 to 1,000,000.

In an embodiment, the siloxane polymer includes substituted alkyl groups.

In an embodiment, the average molecular weight of the siloxane polymer is at least 50,000.

In an embodiment, the siloxane polymer comprises approximately 8% to about 95% by weight of the gum base.

In an embodiment, the siloxane polymer comprises approximately 30% to about 90% by weight of the gum base.

In an embodiment, the polar polymers comprise approximately 5% to about 80% by weight of the gum base.

In an embodiment, the polar polymers comprise approximately 10% to about 60% by weight of the gum base.

In an embodiment, the polar polymers are chosen from the group consisting of polyvinylacetate, ethylenevinylacetate polymer, vinylacetate-vinyllaurate copolymers, vinylester polymers, methacrylates, ethacrylates, and thermoplastic or elastomeric polyesters such as polyesters of multifunctional acids such as diacids, triacids, etc.

In an embodiment, the thermoplastic or elastomeric polyesters are chosen from the group consisting of polyesters of multifunctional acids or multifunctional esters, such as those including edibles produced through a reaction of at least one alcohol chosen from a group consisting of glycerol, propylene glycol, and 1,3 butane diol, and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid and tartaric acid.

In an embodiment, the ratio of siloxane polymer to polar polymer is approximately 20:80 to about 95:5.

In an embodiment, the filler comprises approximately 15 to about 50% by weight of the base.

In another embodiment of the present invention, a chewing gum is provided comprising a water soluble gum portion and a water insoluble base portion that includes a siloxane polymer and a polar polymer.

In an embodiment, the insoluble base portion further comprises a filler.

In another embodiment, the gum base comprises approximately 5% to about 95% of the chewing gum.

In yet another embodiment of the present invention, a method for producing gum base is provided comprising the steps of using a siloxane polymer and polar polymer to produce a gum base.

An advantage of the present invention is that it provides chewing gum compositions that have reduced adhesive characteristics while retaining desirable chewing gum texture.

Furthermore, an advantage of the present invention is to provide an improved gum base.

Another advantage of the present invention is that it provides a gum base that provides chewing gums that produce chewed gum cuds having reduced adhesiveness to environmental surfaces.

Still, an advantage of the present invention is to provide a chewing gum composition that after being chewed can easily be removed from physical surfaces.

Moreover, another advantage of the present invention is to provide a chewing gum composition that even if improperly discarded, will not create environmental concerns.

Additional features and advantages of the present invention are described in, and will be apparent from, the Detailed Description of the Presently Preferred Embodiments.

DETAILED DESCRIPTION OF THE PRESENTLY PREFERRED EMBODIMENTS

The present invention provides improved chewing gum compositions, gum bases for making chewing gum compositions, and methods for making same. Pursuant to the present invention, gum bases are provided that create chewing gums that produce chewed gum cuds having less adhesive characteristics. Thus, the resultant chewing gum cuds are easier to remove than conventional chewed gum cuds; because the gum base reduces adhesion of improperly discarded gum cuds to environmental surfaces such as wood, concrete, fabric, carpet, metal, and other sources. But, the chewing gums retain their desirable chewing characteristics. Pursuant to the present invention, the gum base includes a siloxane polymer, a polar polymer, and optionally a filler.

Polysiloxanes are polymers that include alternating silicon and oxygen atoms in the polymeric backbone. Typically, each silicon atom carries two alkyl side groups. Most commonly, these side groups are methyl groups. In such cases these polymers are known as polydimethylsiloxane. More commonly these polymers are known as silicones.

The selection and frequency of substituted alkyl groups is an important aspect of the present invention. By substituted alkyl groups, it is meant that alkyl groups other than methyl are substituted for at least some of the methyl groups in the polydimethylsiloxane. If the substituted side groups are too long or too frequent, the adhesion of the gum cud may not be reduced and compatibility problems with the polar polymer may result. In general, linear alkane groups of 1 to 5 carbons are preferred with 1 to 3 carbons being most preferred. However, the presence of small quantities of higher alkyl groups may not pose any concern. The preferred siloxane polymer is polydimethylsiloxane.

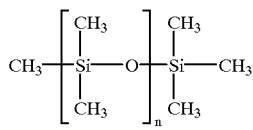

Polydimethylsiloxane (PDMS)

While linear polysiloxanes are preferred, branched and cross-linked polysiloxanes may be used.

The average molecular weight of the siloxane polymer may be an important consideration. Generally, siloxane polymers having an average molecular weight in the range of 50,000 or higher are preferred with an average molecular weight of approximately 200,000 to about 1,000,000 being most preferred. The average molecular weight should be high enough that the polymer is substantially solid rather than a viscous liquid at room temperature. At the other extreme, siloxane polymer having an excessive molecular weight may result in an excessively hard chew.

The siloxane polymer may comprise approximately 8% to about 95% by weight of the base. Preferably, the siloxane polymer can comprise approximately 30% to about 90% by weight of the base. Most preferably, the siloxane polymer comprises approximately 40% at about 80% of the base.

In addition to siloxane polymer, the base of the present invention includes polar polymers. A polar polymer, as that term is used in the instant patent application, is a polymer that has an affinity for water. Examples of such polymers include polyvinylacetate, ethylenevinylacetate polymer, vinylacetate-vinyllaurate copolymers and other vinylester polymers, methacrylates, ethacrylates, edible polyesters of multifinctional acids, such as those including edible polyesters produced through a reaction of at least one alcohol chosen from the group consisting of glycerol, propylene glycol, and 1,3 butane diol, and at least one acid chosen from the group consisting of citric acid, fumaric acid, adipic acid, malic acid, succinic acid, suberic acid, sebacic acid, dodecanedioic acid, glucaric acid, glutamic acid, is glutaric acid, azelaic acid and tartaric acid.

These polar polymers can have a variety of ranges of average molecular weight. But preferably, the average molecular weight of the polar polymers is approximately 10,000 to about 200,000. Most preferably the average molecular weight of the polar polymers is approximately 10,000 to about 100,000.

The polar polymers may comprise approximately 5% to about 80% by weight of the base. Preferably, the polar polymers comprise approximately 10% to about 60% by weight of the base. Most preferably, polar polymers comprises approximately 15% to abut 50% of the base.

Fillers may also comprise a portion of the base of the present invention. Fillers that can be used in the present invention can include any food acceptable water insoluble powders, typically inorganic compounds. Calcium carbonate, talc, and gypsum are preferred. Organic fillers such as vegetable fibers and proteins may also be used. The filler can be used at levels up to approximately 50%; preferably approximately 15 to about 30%.

A wide range of formulas for the base may be utilized. Factors that can influence the formula include: molecular weight of the siloxane polymer; side groups of the silicon atoms in the siloxane polymer; which polar polymer is used; the molecular weight of the polar polymer; the filler that is used; the presence, level and nature of additional base components which may used at minor levels; and the manufacturer's preference for texture cost and intended use.

The base will be formulated with a ratio of siloxane polymer: polar polymers of approximately 20:80 to about 95:5. Preferably, the ratio of siloxane polymer: polar polymers will be in the range of approximately 40:60 to about 90:10.

Usage levels of the base in a chewing gum formula will follow typical practice of approximately 5 to 95% with approximately 15 to 50% being preferred.

Chewing gum generally consists of a water insoluble gum base, a water soluble portion, and flavors. The water soluble portion dissipates with a portion of the flavor over a period of time during chewing. The gum base portion is retained in the mouth throughout the chew. The insoluble gum base generally comprises elastomers, resins, fats and oils, softeners, and inorganic fillers.

Elastomers provide the rubbery, cohesive nature to the gum which varies depending on this ingredient's chemical structure and how it is blended with other ingredients. Elastomers suitable for use in gum base may include natural rubber such as smoked or liquid latex and guayule, natural gums such as jelutong, lechi caspi perillo, massaranduba, balata, massaranduba chocolate, nispero, rosidinha, chicle, gutta percha, gutta kataiu, niger gutta, tunu, chilte, chiquibul, gutta hang kang, synthetic rubber such as butadiene-styrene copolymers, polyisobutylene, isobutylene-isoprene copolymers, polybutadiene, vinyl polymers such as polyvinyl acetate, polyethylene, vinyl copolymers such as vinyl acetate/vinyl laurate, ethylene/vinyl acetate, polyvinyl alcohol or mixtures thereof. The elastomers can comprise of up to approximately 10% by weight of the base.

Elastomer plasticizers vary the firmness of the gum base. Their polymer plasticizing strength and their varying softening points cause varying degrees of finished gum firmness when used in gum base. This is an important consideration when one wants to use flavors that differ in plasticizing strength of the gum base in finished gum.

Elastomer plasticizers suitable for use in gum base include natural rosin esters such as glycerol ester of partially hydrogenated rosin, glycerol ester of polymerized rosin, glycerol ester of partially dimerized rosin, glycerol ester of rose, glycerol ester of tall cil rosin, pentaerythritol esters of partially hydrogenated rose, partially hydrogenated methyl esters of rosin, pentaerythritol ester of rosin, synthetic elastomer plasticizers such as terpene resins derived from alpha-pinene, beta-pinene and/or d-limonene and mixtures thereof The elastomer plasticizers can comprise up to approximately 15% by weight of the base.

Softeners modify the texture and in some cases act as an emulsifier to cause the hydrophobic and hydrophilic components of the base/chewing gum to be miscible. Softeners suitable for use in the inventive gum base include hydrogenated vegetable oil, non-hydrogenated vegetable oil, lard, hydrogenated tallow, cocoa butter, glycerol monostearate, glycerol triacetate, lecithin, mono-, di and triglycerides, acetylated mono-, di and triglycerides, distilled mono-, di or triglycerides, fatty acids such as stearic, palmitic, oleic, linoleic and linolenic or mixtures thereof. The softeners can comprise up to 20% by weight of the base.

Waxes aid in the curing of the finished gum made from the gum base as well as improve the release of flavor, shelf-life and texture. Waxes suitable for the present invention include synthetic waxes such as polyethylene and Fischer-Tropsch waxes, natural waxes such as candelilla, carnauba, beeswax, rice bran, petroleum waxes such as microcrystalline and paraffin and mixtures thereof.

Antioxidants prolong shelf-life and storage of gum base, finished gum or their respective components including fats and flavor oils. Antioxidants suitable for use in gum base include butylated hydroxyznisole (BHA), butylated hydroxytoluene (BHT), beta-carotenes, tocopherols, Vitamin C, propyl gallate, other synthetic and natural types or mixtures thereof.

Colorants impart desired color characteristics or remove undesired color by whitening of the base. Colorants suitable for use in gum base include FD&C type lakes, plant extracts, fruit and vegetable extracts, titanium dioxide or mixtures thereof.

The total level of the ingredients for the base, not including the siloxane polymer, filler, and polar polymer, should be less than or equal to 30% by weight and preferably less than or equal to 15% by weight.

In addition to a water insoluble gum base portion, typical chewing gum compositions includes a water soluble bulk portion and one or more flavoring agents. The water soluble portion can include bulk, high intensity sweeteners, flavoring agents, softeners, emulsifiers, acidulants, fillers, antioxidants, and other components that provide desired attributes.

Softeners are added to the chewing gum in order to optimize the chewability and mouth feel of the gum. The softeners, which are also known as plasticizers and plasticizing agents, generally constitute between approximately 0.5 to about 15% by weight of the chewing gum. The softeners may include glycerin, lecithin, and combinations thereof. Aqueous sweetener solutions such as those containing sorbitol, hydrogenated starch hydrolysates, starch hydrolysates and combinations thereof, may also be used as softeners and binding agents in chewing gum.

Bulk sweeteners include both sugar and sugarless components. Bulk sweetener typically constitutes 5 to about 95% by weight of the chewing gum, more typically, 20 to 80% by weight, and more commonly, 30 to 60% by weight of the gum.

Sugar sweeteners generally include saccharide-containing components commonly known in the chewing gum art, including, but not limited to, sucrose, dextrose, maltose, dextrin, dried invert sugar, fructose, levulose, glalactose, corn syrup solids, and the like, alone or in combination.

Sorbitol can be used as a sugarless sweetener. Additional sugarless sweeteners can include, but are not limited to, other sugar alcohols such as mannitol, sylitol, hydrogenated starch hydrolysates, maltitol, and the like, alone or in combination.

High intensity artificial sweeteners can also be used in combination with the above. Preferred sweeteners include, but are not limited to, sucralose, aspartame, salts of acesulfame, alitame, saccharin and its salts, cyclamic acid and its salts, glycyrrhizin, dihydrochalcones, thaumatin, monellin, and the like, alone or in combination. In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

Usage level of the artificial sweetener will vary greatly and will depend on such factors as potency of the sweetener, rate of release, desired sweetness of the product, level and type of flavor used and cost considerations. Thus, the active level of artificial sweetener may vary from 0.02 to about 8%. When carriers used for encapsulation are included, the usage level of the encapsulated sweetener will be proportionately higher.

Combinations of sugar and/or sugarless sweeteners may be used in chewing gum. Additionally, the softener may also provide additional sweetness such as with aqueous sugar or alditol solutions.

If a low calorie gum is desired, a low calorie bulking agent can be used. Examples of low caloric bulking agents include: polydextrose; oligofructose; frutooligosaccharide; palatinose oligosaccharide; natural carbohydrate gum hydrolysate; or indigestible dextrins. However, other low calorie bulking agents can be used.

A variety of flavoring agents can be used. The flavor can be used in amounts of approximately 0.1 to about 15 weight percent of the gum, and preferably, about 0.2 to about 5%. Flavoring agents may include essential oils, synthetic flavors or mixtures thereof including, but not limited to, oils derived from plants and fruits such as citrus oils, fruit essences, peppermint oil, spearmint oil, other mint oils, clove oil, oil of wintergreen, anise and the like. Artificial flavoring agents and components may also be used. Natural and artificial flavoring agents may be combined in any sensorially acceptable fashion.

By way of example, and not limitation, examples of the invention will be given:

EXAMPLE 1

|  | % |
| --- | --- |
| Paraffin Wax | 13.3 |
| Polyisobutylene | 1.6 |
| Butyl Rubber | 10.1 |
| Polyvinylacetate | 27.3 |
| Terpene Resin | 26.8 |
| Lecithin | 2.7 |
| Glycerol Monostearate | 4.8 |
| Hydrogenated Vegetable Oil | 2.0 |
| Calcium Carbonate | 10.8 |
| BHT | 0.1 |
| Color | 0.5 |
|  | 100.00 |

EXAMPLES 2–8

Embodiments of the present invention were prepared using polydimethylsiloxane (PDMS) available from United Chemical Technologies, 2731 Bartram Rd., Bristol Pa. 19007 (USA) Catalog No. PS240-KG. This polymer is believed to have an average molecular weight of over 300,000. The inventive bases were prepared according to the following formulas:

|  | Ex. 2 | Ex. 3 | Ex. 4 |
|---|---|---|---|
| Polyvinyl Acetate (MW ~ 14,000) | 30.00 | 20.00 | 10.00 |
| PDMS | 70.00 | 80.00 | 90.00 |
|  | 100.00 | 100.00 | 100.00 |

Chewing gums were prepared according to the following formulas:

|  | Ex. 5 (Comparative) | Ex. 6 (Inventive) | Ex. 7 (Inventive) | Ex. 8 (Inventive) |
|---|---|---|---|---|
| Gum Base of Example 1 | 20.70% | — | — | — |
| Gum Base of Example 2 | — | 20.70% | — | — |
| Gum Base of Example 3 | — | — | 20.70 | — |
| Gum Base of Example 4 | — | — | — | 20.70 |
| Sugar | 54.10 | 54.10 | 54.10 | 54.10 |
| Corn Syrup | 13.20 | 13.20 | 13.20 | 13.20 |
| Dextrose Monohydrate | 10.20 | 10.20 | 10.20 | 10.20 |
| Glycerin | 1.20 | 1.20 | 1.20 | 1.20 |
| Spearmint Flavor | 0.60 | 0.60 | 0.60 | 0.60 |
|  | 100.00 | 100.00 | 100.00 | 100.00 |

The chewing gums of Examples 5, 6, 7, and 8 were tested for adhesion to concrete according to the following method.

Gum pieces were soaked in water overnight then kneaded under water for one minute to remove water soluble components. The cuds were applied to concrete blocks using 200 pounds of pressure for five seconds.

In a screening test, the concrete was heated to 105° F. for four hours and cooled overnight. A high-pressure spray washer using cold tap water and 1000 psi pressure was used to remove cud. The time to remove and the quantity of residue remaining were noted.

In an extreme test, the concrete block was heated to 120° F. for three days, cooled overnight and washed with the washer at 1500 psi until the bulk of the cud was dislodged. Spraying was continued for a total of 60 seconds or until the surface was completely clean. The time to remove the cud and the time to clean a quantity of residue remaining after 60 seconds were noted.

|  | Screening Test | | Extreme Test | |
|---|---|---|---|---|
|  | Time | Residue | Time(s)* | Residue (wash time)* |
| Ex. 5 (Comparative) | 6.0 | Medium | 11.5 | Very High (60s) |
| Ex. 6 (70% PDMS) | 1.4 | Clean | 2.5 | Clean (2.5s) |
| Ex. 7 (90% PDMS) | 2.0 | Clean | 2.3 | Clean (2.3s) |
| Ex. 8 (90% PDMS) | 1.7 | Clean | 2.2 | Clean (2.2s) |

*-Seconds

As can be seen, the inventive gums exhibited much less adhesion than the prior art comparative gum.

It should be understood that various changes and modifications to the Presently Preferred Embodiments described herein will be apparent to those skilled in the art. Such changes and modifications can be made without departing from the spirit and scope of the present invention and without diminishing its attendant advantages. It is therefore intended that such changes and modifications be covered by appended claims.

We claim:

1. A chewing gum base comprising:
    a siloxane polymer that is solid at room temperature and has an average molecular weight of approximately 300,000 to about 1,000,000; and
    a polar polymer.

2. The gum base of claim 1 wherein the gum base includes a filler.

3. The gum base of claim 2 wherein the filler comprises approximately 15 to about 50% by weight of the base.

4. The gum base of claim 2 wherein the filler comprises approximately 15% to about 30% by weight of the base.

5. The gum base of claim 1 wherein the siloxane polymer is polydimethylsiloxane.

6. The gum base of claim 1 wherein the siloxane polymer includes substituted alkyl groups.

7. The gum base of claim 1 wherein the siloxane polymer comprises approximately 8% to about 95% by weight of the gum base.

8. The gum base of claim 1 wherein the siloxane polymer comprises approximately 30% to about 90% by weight of the gum base.

9. The gum base of claim 1 wherein the siloxane polymer comprises approximately 40% to about 80% by weight of the gum base.

10. The gum base of claim 1 wherein the polar polymer comprises approximately 5% to about 80% by weight of the gum base.

11. The gum base of claim 1 wherein the polar polymer comprises approximately 10% to about 60% by weight of the gum base.

12. The gum base of claim 1 wherein the polar polymer comprises approximately 15% to about 50% by weight of the gum base.

13. The gum base of claim 1 wherein the polar polymer is chosen from the group consisting of polyvinylacetate, ethylenevinylacetate polymer, vinylacetate-vinyllaurate copolymers, vinylester polymers, methacrylates, ethacrylates, and edible polyesters of difunctional acids.

14. The gum base of claim 13 wherein the edible polyesters of difunctional acids are chosen from the group consisting of edibles produced through a reaction of at least one alcohol chosen from the group consisting of glycerol, propylene glycol, and 1,3 butylene diol, and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid and tartaric acid.

15. The gum base of claim 1 wherein the ratio of siloxane polymer to polar polymer is approximately 20:80 to about 95:5.

16. The gum base of claim 1 wherein the ratio of siloxane polymer to polar polymer is approximately 40:60 to about 90:10.

17. A chewing gum comprising:
    a water soluble portion; and
    a water insoluble portion including a siloxane polymer that is solid at room temperature and has an average molecular weight of approximately 300,000 to about 1,000,000; and a polar polymer.

18. The chewing gum of claim 17 wherein the insoluble portion includes a filler.

19. The chewing gum of claim 17 wherein the siloxane polymer is polydimethylsiloxane.

20. The chewing gum of claim 17 wherein the siloxane polymer includes substituted alkyl groups.

21. The chewing gum of claim 17 wherein the siloxane polymer comprises approximately 8% to about 95% by weight of the gum base.

22. The chewing gum of claim 17 wherein the polar polymer comprise approximately 5% to about 80% by weight of the base.

23. The chewing gum of claim 17 wherein the polar polymer is chosen from the group consisting of polyvinylacetate, ethylenevinylacetate polymer, vinylacetate-vinyllaurate copolymers, vinylester polymers, methacrylates, ethacrylates, and edible polyesters of difunctional acids.

24. The chewing gum of claim 23 wherein the edible polyesters of difunctional acids are chosen from the group consisting of edibles produced through a reaction of at least one alcohol chosen from a group consisting of glycerol, propylene glycol, and 1,3 butylene diol, and at least one acid chosen from the group consisting of citric acid, fumaric acid, adipic acid, malic acid, succinic acid, suberic acid, sebacic acid, dodecanedioic acid, glucaric acid, glutamic acid, glutaric acid, azelaic acid and tartaric acid.

25. The gum base of claim 17 wherein the ratio of siloxane polymer to polar polymer is approximately 20:80 to about 95:5.

26. A method for producing chewing gum base comprising the steps of:

mixing a siloxane polymer that is solid at room temperature and has an average molecular weight of approximately 300,000 to about 1,000,000 and a polar polymer with chewing gum base components in the production of a chewing gum base.

27. The method of claim 26 including the step of adding to the gum base a filler.

28. The method of claim 26 including the step of adding an elastomer, softener, and emulsifier to produce the gum base.

29. The method of claim 26 wherein the siloxane polymer and polar polymer comprise at least 70% of the gum base by weight.

* * * * *